US008140967B2

(12) United States Patent  
Horiuchi

(10) Patent No.: US 8,140,967 B2  
(45) Date of Patent: Mar. 20, 2012

(54) INFORMATION PROCESSING APPARATUS, INFORMATION PROCESSING METHOD, AND PROGRAM

(75) Inventor: Yoshio Horiuchi, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 318 days.

(21) Appl. No.: 12/538,125

(22) Filed: Aug. 8, 2009

(65) Prior Publication Data

US 2010/0042914 A1 Feb. 18, 2010

(30) Foreign Application Priority Data

Aug. 13, 2008 (JP) ................................. 2008-208743

(51) Int. Cl.
*G06F 17/00* (2006.01)
(52) U.S. Cl. ........................................ 715/273; 715/235
(58) Field of Classification Search .................. 715/234, 715/235, 236, 237, 243, 273
See application file for complete search history.

(56) References Cited

U.S. PATENT DOCUMENTS

| 5,467,472 | A | * | 11/1995 | Williams et al. | 1/1 |
| 6,021,220 | A | * | 2/2000 | Anderholm | 382/194 |
| 6,177,933 | B1 | * | 1/2001 | Young | 715/805 |
| 7,165,041 | B1 | * | 1/2007 | Guheen et al. | 705/26.1 |
| 7,617,447 | B1 | * | 11/2009 | Jones et al. | 715/234 |
| 7,756,800 | B2 | * | 7/2010 | Chidlovskii | 706/20 |
| 2004/0031058 | A1 | * | 2/2004 | Reisman | 725/112 |
| 2006/0010374 | A1 | * | 1/2006 | Corrington et al. | 715/517 |
| 2007/0186160 | A1 | * | 8/2007 | McArdle et al. | 715/700 |
| 2007/0283243 | A1 | * | 12/2007 | Beiser et al. | 715/513 |
| 2008/0222734 | A1 | * | 9/2008 | Redlich et al. | 726/26 |
| 2008/0313282 | A1 | * | 12/2008 | Warila et al. | 709/206 |
| 2009/0031211 | A1 | * | 1/2009 | Yao et al. | 715/234 |
| 2009/0113280 | A1 | * | 4/2009 | Rogers et al. | 715/204 |

OTHER PUBLICATIONS

Yesilada, Yeliz, et al, "COHSE: Dynamic LInking of Web Resources", Sun Microsystems, Inc., Mar. 2007, pp. 1-83.*

* cited by examiner

*Primary Examiner* — Laurie Ries
(74) *Attorney, Agent, or Firm* — Steven M. Greenberg, Esq.; Carey, Rodriguez, Greenberg & O'Keefe

(57) ABSTRACT

An information processing apparatus 10 according to the present invention includes: a registration section 64 for registering plural classes defining respective styles; a search section 52 for searching for, from the registered classes, candidate classes similar to a data set including property values specifying one or more given style characteristics; a presentation section 58 for selectably presenting the retrieved candidate classes; and an application section for giving the one or more input property values as the data set and applying style definition to the structured document using a class confirmed from the selectable candidate classes.

15 Claims, 13 Drawing Sheets

| CLASS NAME | CONTENT | PATH |
|---|---|---|
| .important | background-color: red; border-style: dotted; padding: 2px; | WEB-INF/master.css |
| .normal | background-color: green; border-style: solid; padding: 2px; | WEB-INF/master.css |
| ... | ... | WEB-INF/master.css |
| .eyecatch | background-color: red; font-weight: bolder; | form.css |
| ... | ... | form.css |
| .error | background-color: red; padding: 15px; | <STYLE> |
| ... | ... | <STYLE> |

INFORMATION PROCESSING APPARATUS, INFORMATION PROCESSING METHOD, AND PROGRAM

CROSS-REFERENCE TO RELATED APPLICATIONS

This application claims priority under 35 U.S.C. §119(a) to Japanese Patent Application Serial Number 2008-208743, filed Aug. 13, 2008, entitled "INFORMATION PROCESSING APPARATUS, INFORMATION PROCESSING METHOD, AND PROGRAM", the entirety of which is incorporated herein by reference.

BACKGROUND OF THE INVENTION

1. Field of the Invention

The present invention relates to a structured document creating application, and more particularly, to an information processing apparatus, an information processing method, and a program, which enable efficient editing of a stylesheet such as CSS defining the style of a structured document such as HTML.

2. Description of the Related Art

Cascading style sheets (hereinafter referred to as "CSS") defining the detailed layout of a page plays an important role in designing a portal site, a web application, or a homepage. The CSS specifications have been defined by W3C (World Wide Web Consortium) recommendations. W3C recommended CSS Level 2 (CSS 2) in 1998, and W3C candidate recommendation of CSS Level 2 Revision 1 (CSS 2.1) and the draft of Level 3 (CSS 3) are now available and continue to further expand.

CSS is configured to include definitions of style that specify modifications to elements in a structured document described in HTML, XML, XHTML, or other markup language, making it possible to define information related to the layout, such as font and font size, font modifier, and line spacing, separately from the document body. Thus, CSS makes it possible to switch stylesheets depending on the display medium on which pages are displayed, such as either a personal computer or a personal digital assistant, and superimpose the effects of styles respectively defined by a user agent, a site creator, and a user who browses the site.

On the other hand, various sophisticated web authoring tools, such as Homepage Builder®, WebSphere® Studio Application Developer, Rational® Application Developer for WebSphere® Software, Microsoft® FrontPage®, and Adobe® Dreamweaver®, have been offered in recent years. The above-mentioned web authoring tools have a function for editing the CSS by a menu selection method or a direct code description method, enabling definition of style for a portal site, a web application, or a homepage in a unified way.

Use of the conventional CSS editing function may cause a problem upon designing pages if a creator does not have sufficient understanding of what kinds of CSS classes have already been defined, and duplicate definitions specifying the same modifier often occur, and unintentionally added definitions increase the number of class definitions.

Further, even if trying to find a class specifying a desired modification from predefined classes, since the conventional CSS editing function provides only a GUI with a list of classes related to all or certain tags, the creator has to check line by line in order to find the desired class from the list. Thus, the conventional CSS editing function is not enough from the standpoint of user friendliness. In other words, the conventional web authoring tools are not able to make sufficient use of reusability as an excellent feature of CSS class specification.

SUMMARY OF THE INVENTION

The present invention provides an information processing apparatus, an information processing method, and a program, which enable easy reuse of predefined settings in editing a stylesheet defining the style of a structured document described in HTML, XML, XHTML, or other markup language, to reduce the probability of duplicate definitions so that a web content such as a portal site, a web application, or a homepage can be constructed efficiently.

An information processing apparatus according to the present invention registers plural predefined classes each defining a style, searches for candidate classes similar to a desired data set including input property values specifying one or more style characteristics from the predefined classes on the basis of the data set, and presents the candidate classes in a selectable manner. Then, for example, if any of the presented candidate classes is selected and an instruction to confirm the application of the candidate class is received, the information processing apparatus applies the style definition to a structured document using the class confirmed from the selectable candidate classes.

According to the above configuration, since the classes defining the styles similar to the data set including the input, desired property values are retrieved from the registered classes and presented, a user who is creating a web content using the information processing apparatus can not only easily find, from the predefined classes, a class defining such a style to specify a desired modification, but also reuse the predefined classes efficiently, realizing user-friendly, efficient, and effective support of editing of style definition of the structured document. If a similar class is predefined, since the class is presented, the probability that the user makes duplicate definition of a class specifying the same modification is reduced, and hence an increase in data size of style definition and complication of code are prevented.

In an embodiment of the present invention, property values (properties and a set of values) respectively included in the given data set and candidate classes are so compared that complementary definition data for the candidate classes can be created from the differences there between. According to the above configuration, even if property values that exceed a user's tolerance to extra and lacking values exist in candidate classes, a style desired by the user is realized by the minimum style definitions corresponding to different points between the data set and the candidate classes, and this enables use of the predefined classes more efficiently.

In an embodiment of the present invention, a preview in the case that the selected candidate class and corresponding complementary definition data are applied may be drawn. According to such a configuration, the user can check the effect of style appearing when the style definition is applied before the style definition is actually applied to the structured document. This makes it possible to improve the efficiency of web content creation work.

Further, in an embodiment of the present invention, the complementary definition data may be recursively given as a data set so that the next complementary definition data can be created from a difference between the complementary definition data and a recursively retrieved candidate class. According to such a configuration, since a class similar to the created complementary definition data is further retrieved from the registered classes, a new style definition for complement can be made more compact. Further, in this case, the recursively retrieved candidate class can be used in applying the style definition to the structured document.

Further, in an embodiment of the present invention, at least either definition contents of the retrieved candidate classes or paths to files, in which the candidate classes are defined, may be presented together with the candidate classes. Further, in the present invention, the similar candidate classes may be determined, for example, on condition that the values of an evaluation function evaluating the degree of coincidence of property values included in the respective candidate classes are equal or more than a predetermined threshold.

Further, in an embodiment of the present invention, the selective presentation may be performed, for example, by outputting items of candidate classes through an output device of the information processing apparatus in a manner for the user to be able to recognize and waiting for an instruction to select an item from the user through an input device. Further, in the present invention, style definition may be applied by adding the specification of a confirmed class to the attributes of a target element in the structured document and defining each property value of the complementary definition data in line for the target element, or by adding the specification of the confirmed class and the specification of a newly defined class corresponding to the complementary definition data to the attributes of the target element in the structured document.

BRIEF DESCRIPTION OF THE DRAWINGS

FIG. 4 is a table showing the data structure of a class registration table held by a class registering section of the embodiment;

FIG. 11 is an illustration of an editing support GUI screen displayed on display screen according to the other embodiment;

DETAILED DESCRIPTION OF THE PREFERRED EMBODIMENTS

While embodiments of the present invention will now be described, the present invention is not limited to the embodiments below. The following embodiments of the present invention take, by way of example, a computer system implementing a web authoring tool using an HTML document as a structured document and cascading style sheets (CSS) as style definitions to be edited.

Figure 1:
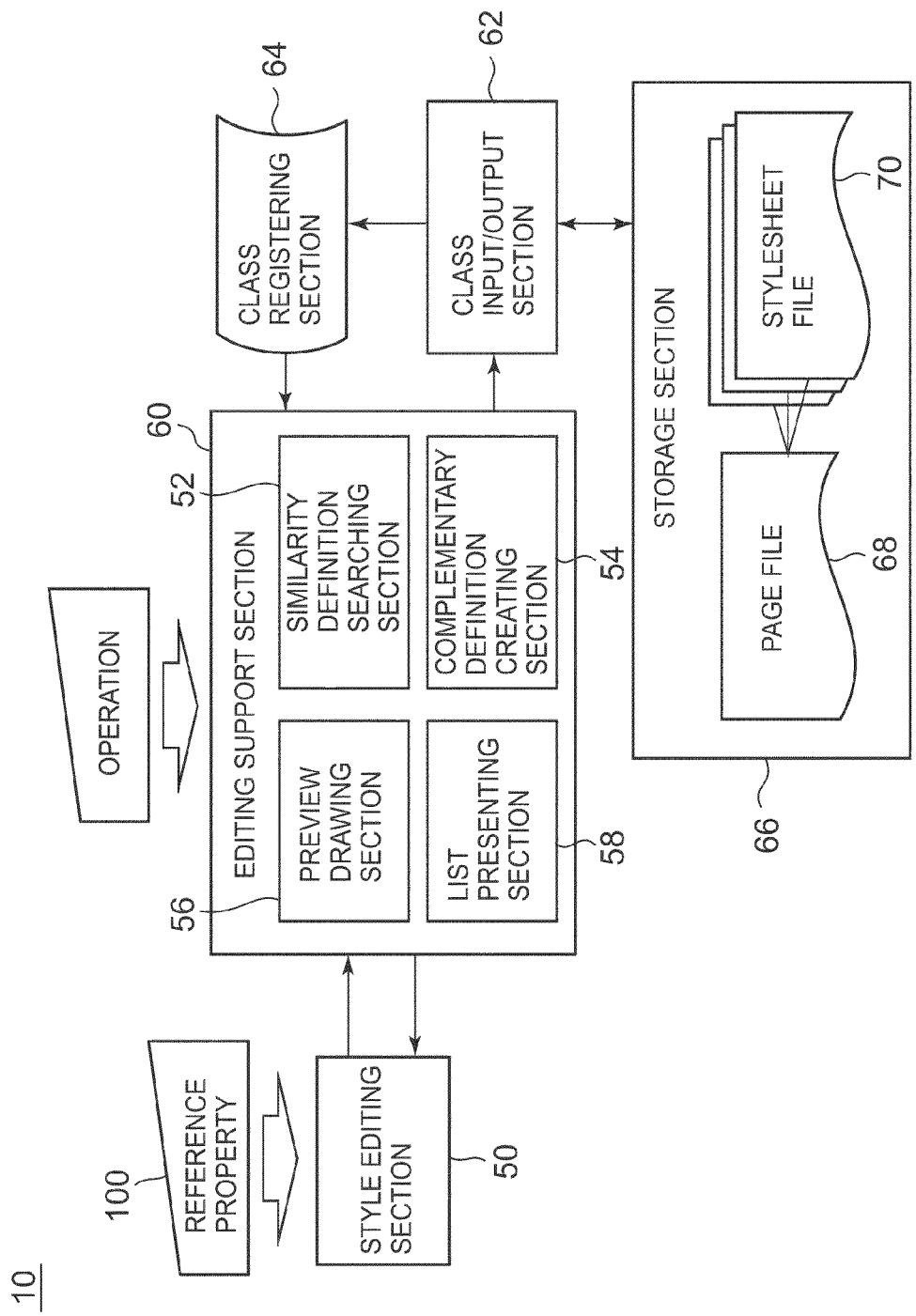
FIG. 1 is a diagram showing the functional blocks of a computer system according to the embodiment.

FIG. 1 shows functional blocks of a computer system 10 according to the embodiment. The computer system 10 is configured generally as a personal computer. Each of functional sections (the details thereof will be described later) included in the computer system 10 shown in FIG. 1 and the function as a web authoring tool for editing web contents are implemented on the computer system 10 by deploying a program on a memory and executing the program to control the operation of each of hardware resources. The computer system 10 is provided with a user interface section including input devices such as a mouse and a keyboard so that an operation event corresponding to input from an input device is passed to each functional section under the control of a proper operating system (OS) and the processing result in response to the operation event is output to an output device such as a display. A graphical user interface (GUI) is provided by the input devices and the display.

The computer system 10 of the embodiment is configured to include a style editing section 50 for providing a function for editing the style of a HTML document. The style editing section 50 of the embodiment functions as an application section. The style editing section 50 provides a GUI for defining the style for certain elements in the HTML document. For example, the elements to which the style is applied include, but not limited to, block elements containing P element, H1 element, H2 element, H3 element, DIV element, TABLE element, etc., in-line elements containing SPAN element, IMG element, EM element, STRONG element, etc., and INS elements and DEL elements functioning as in-line or block elements.

The style specified for the above-mentioned elements may include those specifying various modifications, though they depend on the types of target elements, such as specifications related to the foreground and background (color, background-attachment, background-color, background-image, background-position, etc.), specifications related to fonts (font, font-style, font-variant, font-weight, font-size, font-family, etc.), specifications related to the style of text (line-height, text-align, vertical-align, text-decoration, text-indent text-transform, white-space, letter-spacing, word-spacing, etc.), specifications related to the size (width, max-width, min-width, height, max-height, min-height, etc.), specifications related to margins (margin-top, margin-bottom, margin-left, margin-right, padding-top, etc.), specifications related to borders (border-color, border-style, border-width, border-top, border-top-color, border-top-style, border-top-width, etc.), and specifications related to other elements including tables (table-layout, caption-side, border-collapse, etc.), lists (list-style, list-style-image, list-style-type, list-style-position), and outlines (outline, outline-color, outline-style, outline-width, etc.

The computer system 10 of the embodiment is also configured to include an editing support section 60 which provides a function for supporting CSS editing operations, a storage section 66 which stores a page file 68 and stylesheet files 70 for the HTML document, and a class input/output section 62 which reads predefined CSS classes (the term "class" denotes the "CSS class" below unless otherwise noted) from the page file and the stylesheet files, and registers them in a class registering section 64. The class registering section 64 is provided by a memory or a hard disk of the computer system 10 to register the predefined classes in a searchable data structure in order to support editing.

The classes registered to be searchable may be, but not particularly limited to, those described in the page file and the stylesheet files within a project managed by the web authoring tool as editing targets. In another embodiment, only classes described in the page file 68 as the current editing target and described in other external file(s) declared to be read into the page may also be registered. In still another embodiment, the classes may be incorporated into a search range across plural projects managed by the web authoring tool.

Specifically, the editing support section 60 is configured to include a similarity definition searching section 52 and a list presenting section 58. When a user enters a set 100 of desired CSS property values (the term "property value" denotes the "CSS property value" below unless otherwise noted) for certain elements (hereinafter referred to as "reference property"), the style editing section 50 passes the reference property 100 to the editing support section 60 to request the editing support section 60 to perform editing support processing. The reference property 100 passed is given to the similarity definition searching section 52. The similarity definition searching section 52 searches for classes conforming to the types of target elements and similar to the reference property 100 from the predefined classes registered in the class registering section 64.

The classes conforming to the types of elements may include classes of types that are in agreement with the types of target elements, and classes in which the types of elements are not specified. Further, the similarity definition searching section 52 may calculate a score reflecting a similarity between the reference property 100 and each of the predefined classes using a given evaluation function which evaluates the degree of coincidence of each property value included in the reference property 100 and each of the predefined classes, respectively.

If similar classes are found, the list presenting section 58 sorts the names of the similar classes in order of score or in alphabetical order as selection candidate classes, lists the sorted names in a selectable manner, and waits for selection input from the user. In this case, for example, the list presenting section 58 may present the list by limiting the listed names up to a predetermined rank or score. Further, in addition to the class names, the list presenting section 58 may present the definition contents of the classes, contents of explanation given to the classes, and the like, for example, on a pop-up GUI.

Further, the editing support section 60 of the embodiment may include a complementary definition creating section 54 and a preview drawing section 56. The complementary definition creating section 54 compares respective property values between the reference property 100 and each of the candidate classes to create complementary definition data for complementing a difference(s) therebetween appropriately. When the complementary definition data is created, the list presenting section 58 may further display the definition contents of the complementary definition data on the pop-up GUI.

The preview drawing section 56 draws, for example, on the pop-up GUI, a preview in the case that a candidate class selected at the list presenting section 58 is temporarily applied. Further, if a complementary definition is specified, the preview drawing section 56 draws a preview in the case that the selected candidate class corrected by the complementary definition is temporarily applied. The preview drawing range may be, but not particularly limited to, the whole page being edited, or part of the page consisting of elements below a specific element including the editing target element, such as part of the page consisting of a parent element of the editing target element, the target element, and elements below the target element, or part of the page consisting of the editing target element and elements below the target element.

If a class to be applied is confirmed by the user's operation from the candidate classes, the editing support section 60 notifies, to the style editing section 50, the class name identifying the confirmed class (hereinafter referred to as the "confirmed class"), a path to a file in which the class is defined, and complementary definition data if any. The style editing section 50 adds a class attribute specifying the notified class to the target element in the page file, and applies style definition using the confirmed class. If the complementary definition is specified, the style editing section 50 additionally defines each of the property values, included in the notified complementary definition data, for the target element in the page file in such a manner to give priority over the class specification.

A specific method of adding a definition is not particularly limited as long as it follows the order of priority of recommended cascading. For example, the definition may be added by defining style attributes inline for the target element or by defining a rule set using the ID of the target element as a selector. In this case, if the confirmed class is not associated with a page being edited, a declaration to externally read the file defining the class is written into the HTML document. The above-mentioned additional definition method may also be performed by defining the complementary definition data as a new class to, for example, add class attributes specifying plural classes to the target element. In the case of simultaneous specification of classes, the complementary definition data is given to the class input/output section 62 so that the class input/output section 62 can define it as a class in part of the style definition of the page file. Preferably, the class input/output section 62 defines the class corresponding to the complementary definition data behind the reading position of the confirmed class.

Note that FIG. 1 is to describe the functional blocks related to the CSS editing function, and it is needless to say that the computer system 10 of the embodiment can include various functional sections usable as the functions of a web authoring tool, such as the editing function for HTML documents themselves, the editing function for JSP (Java® Server Pages) files, etc.

Figure 2:
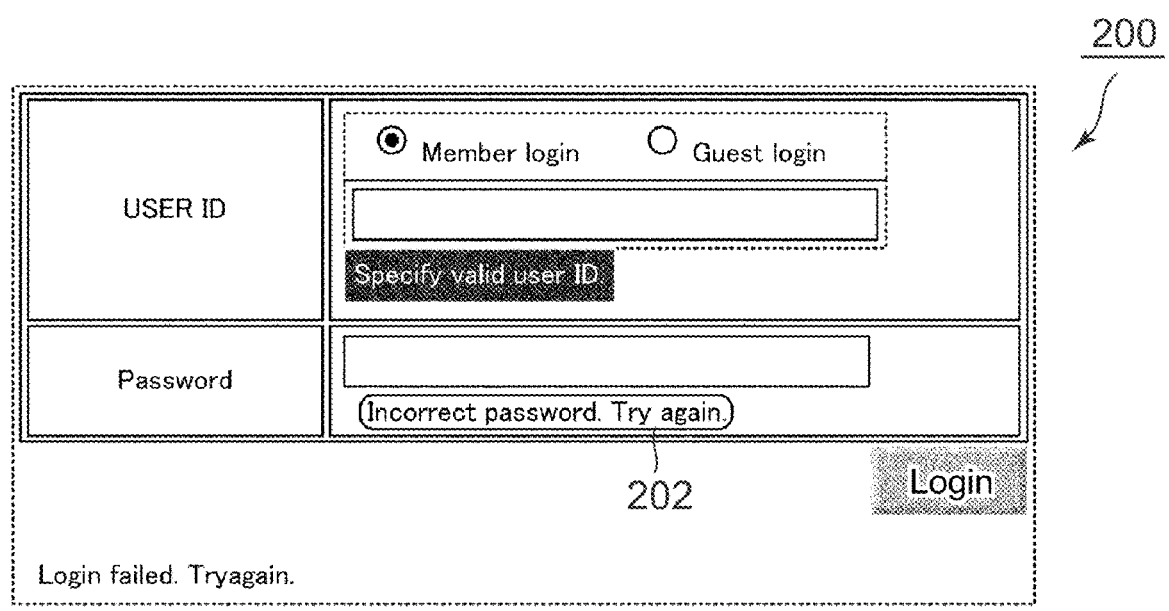
FIG. 2 is an illustration of a page editing GUI screen displayed on a display screen of the computer system according to the embodiment.

The following describes a CSS editing support function of the embodiment with reference to a more specific example. FIG. 2 illustrates a page editing GUI screen displayed on the display of the computer system 10 of the embodiment. In FIG. 2, a log-in panel 200 as a current editing target is shown. If an element of text 202 is selected as a target by the user's operation and the CSS priority editing function is called, a GUI for entering a desired property value for the element is displayed. Then, if one or more property values are entered on this GUI to cause an operation event for calling editing support, a data set of the input property values is passed to the editing support section 60 as the reference property 100 to call the editing support function of the embodiment.

Figure 3:
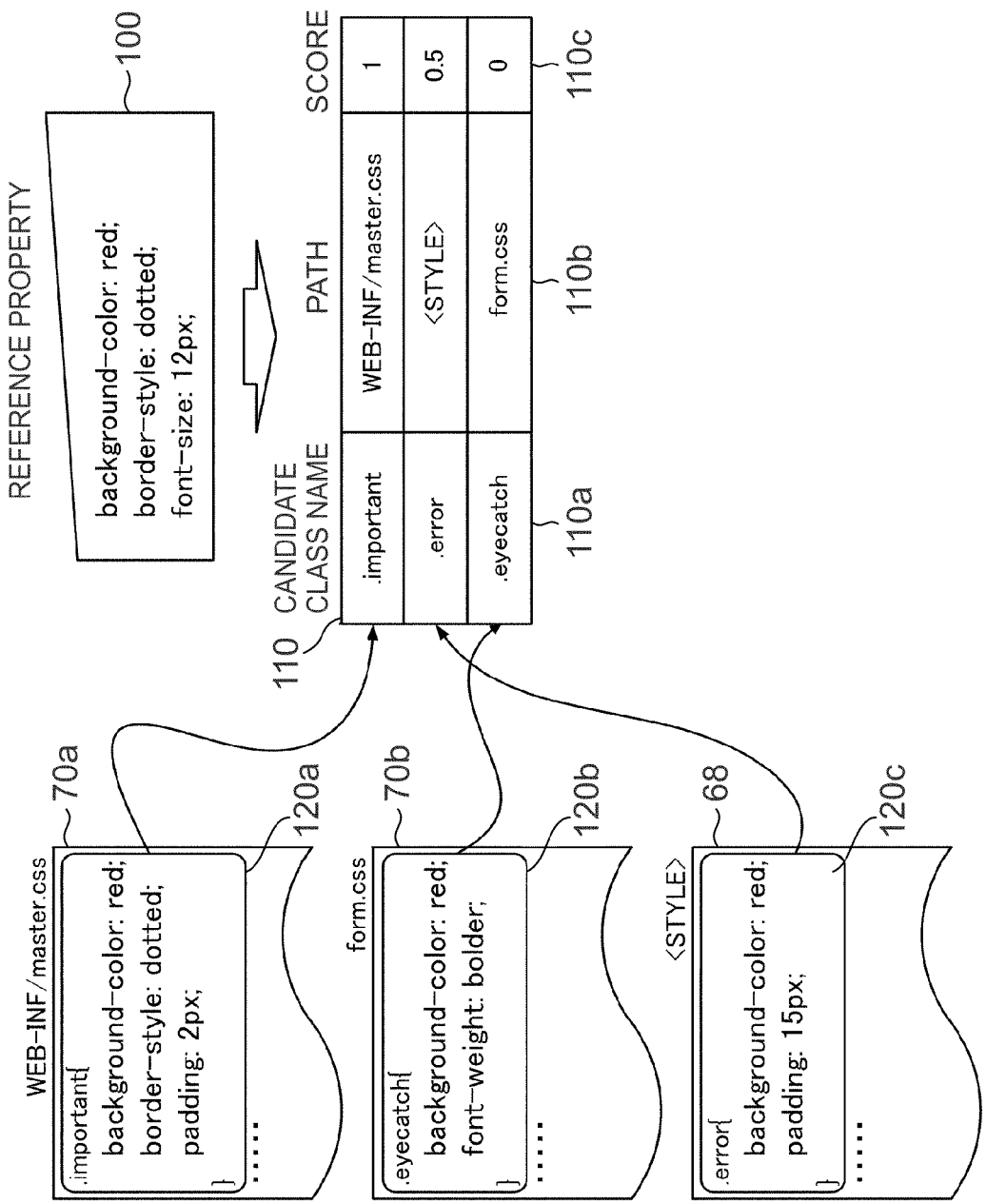
FIG. 3 is a diagram schematically showing an editing support function of the embodiment together with data structures used in respective processing steps.

FIG. 3 is a diagram schematically showing the editing support function of the embodiment together with data structures used in respective processing steps. In FIG. 3, the given reference property 100, the page file 68, and stylesheet files 70a and 70b are shown. The stylesheet files 70a and 70b are configured to include the definitions of classes 120a and 120b, respectively. Similarly, the page file 68 is configured to include the definition of class 120c.

FIG. 4 shows the data structure of a class registration table held by the class registering section 64 of the embodiment. The class input/output section 62 reads the above-mentioned stylesheet files 70a, 70b, and page file 68, creates the class registration table as shown in FIG. 4, and registers predefined classes. The class registration table 140 shown in FIG. 4 is configured to include a field 140a into which class names are entered, a field 140b into which definition contents corresponding to the class names are entered, and a field 140c into which paths to files in which the classes are defined are entered.

The class input/output section 62 shown in FIG. 1 adds class entries in order of reading of style definition information according to the CSS conventions, and if there is a duplicate, the low-priority entry, i.e., the entry corresponding to one class defined ahead of the other is deleted in CSS2, and priority is given to the definition of the other class defined behind of the one class. The specific form of the class registration table 140 is not particularly limited as long as it is configured to be searchable. For example, it may be so configured that the field 140b is managed by subdividing it by each property value described in its content and storing the subdivided contents in a relational database, an object database, an object relational database, or an XML database. In this case, the similarity definition searching section 52 expands a search query for the given reference property 100 in a corresponding query language to query the database about classes similar to the reference property 100.

Referring again to FIG. 3, when the reference property 100 is given to the similarity definition searching section 52, the similarity definition searching section 52 expands the search query to extract classes similar to the reference property 100, and searches for the similar classes from the class registration table 140 to acquire a search result table 110 shown in FIG. 3. The search result table 110 is configured to include a field 110a into which the names of candidate classes are entered, a field 110b into which paths to files in which the candidate classes are defined are entered, and a field 110c into which scores determined according to the evaluation function are entered. Then, the entries of the search result table 110 are sorted according to the score value. In the search result table 110, classes having a predetermined number of property values or more (e.g., one or more property values) match the reference property 100 are entered as candidate classes.

The score that reflect the similarity between the reference property 100 and each of the predefined classes reflects the degree of coincidence of property values respectively included therein, and takes on values depending on the number of matched property values or the like. In the embodiment, it is determined that the property values match when the property values exactly match each other, when the property values are equivalent to each other, or when a difference between the property values falls within an allowable range. Taking "font size: 12 pt" as an example of the font size, the exactly matched property value "font-size: 12 pt," the equivalent property value "font-size: 1 pc," and property values within a range of 11 to 13 pt if the allowable range is ±1 pt may be determined to match.

Similarly, taking "color: skyblue" as an example of the color, the exactly matched property value "color: skyblue," the equivalent property values "color: #87CEEB" and "color: rgb (135, 206, 235)," and property values within a range in which R values are 130 to 140, G values are 201 to 211, and B values are 230 to 240 in RGB representations, or the most significant two digits are 82 to 8C, the following two digits are C9 to D3, and the last two digits are E6 to f0 in hexadecimal color code representations if the allowable range of RGB values is ±5 may be determined to match. The similarity definition searching section 52 of the embodiment expands the search query by deeming that a property value included in the equivalent or allowable range matches each property value of the reference property 100 to perform searching for similar classes. The values in the allowable range can be preset on the setup screen or the like of the web authoring tool, but the setting of the values are not limited thereto.

The score can be calculated using the evaluation function in such a manner to add points (e.g., one point at a time) according to the number of property values compared with the reference property 100 and determined to match the reference property 100, and to deduct points (e.g., one point at a time) according to the numbers of extra property values and lacking property values. More preferably, the value determined by the evaluation function can also be corrected according to each type of file in which a candidate class is defined. For example, the score system can be preferably configured to give a high score to a candidate class declared in the file as the current editing target. The evaluation function itself used in the embodiment is not particularly limited. For example, in another embodiment, weighting of points added to the exact or equivalent property value can be increased, or a correction can be added in order of reading.

In the search result table 110 shown in FIG. 3, the "important" class 120a having both matched property values "background-color: red" and "border-style: dotted" is calculated as a candidate class with the highest score. Further, in the search result table 110 shown in FIG. 3, the classes are so reordered that the "error" class 120c having the matched property value "background-color: red" and defined within the page file 68 being edited becomes the second candidate class, and the "eyecatch" class having the matched property value "background-color: red" and declared in another stylesheet file 70b within the project ranks third.

Figure 5:
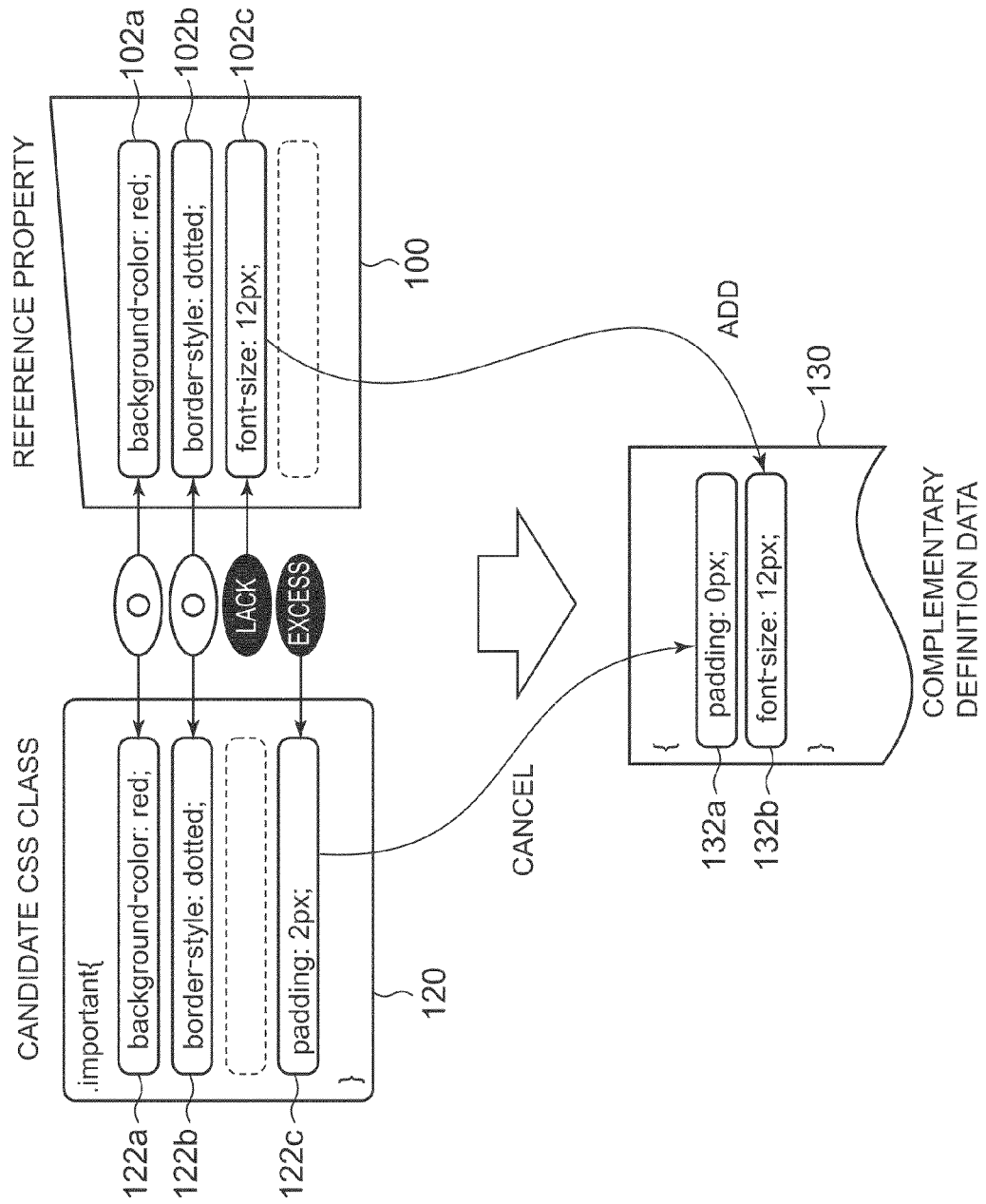
FIG. 5 is a diagram schematically showing processing by a complementary definition creating section of the embodiment together with the data structure used.

The following more specifically describes processing by the complementary definition creating section 54. FIG. 5 is a diagram schematically showing processing by the complementary definition creating section 54 together with the data structure used. In FIG. 5, the definition content of the given reference property 100, the definition content of the candidate class 120, and the definition content of complementary definition data 130 to be created are shown. The reference property 100 and the candidate class 120 are configured to include plural property values 102a to 102c and 122a to 122c, respectively.

In the example shown in FIG. 5, the property values 122a and 122b of the candidate class 120 match the property values 102a and 102b of the reference property 100, respectively. On the other hand, the property value corresponding to the property value 102c included in the reference property 100 is absent on the candidate class 120 side. In other words, the candidate class 120 lacks a property value. Further, the property value corresponding to the property value 122c included in the candidate class 120 is absent on the reference property 100 side, i.e., the candidate class 120 contains an extra property value.

The complementary definition creating section 54 of the embodiment compares the property values respectively included in the reference property 100 and the candidate class 120 to identify the lacking property value 102c and the extra property value 122c. In order to complement these points of difference, the complementary definition creating section 54 adds, to the complementary definition data 130, a supplementary property value 132a corresponding to the identified lacking property value 102c and a canceling property value 132b for canceling the identified extra property value 122c. The supplementary property value may be the lacking property value input to the reference property 100. The canceling property value may be a default value of the same property or a value inherited by the target element.

Figure 6:
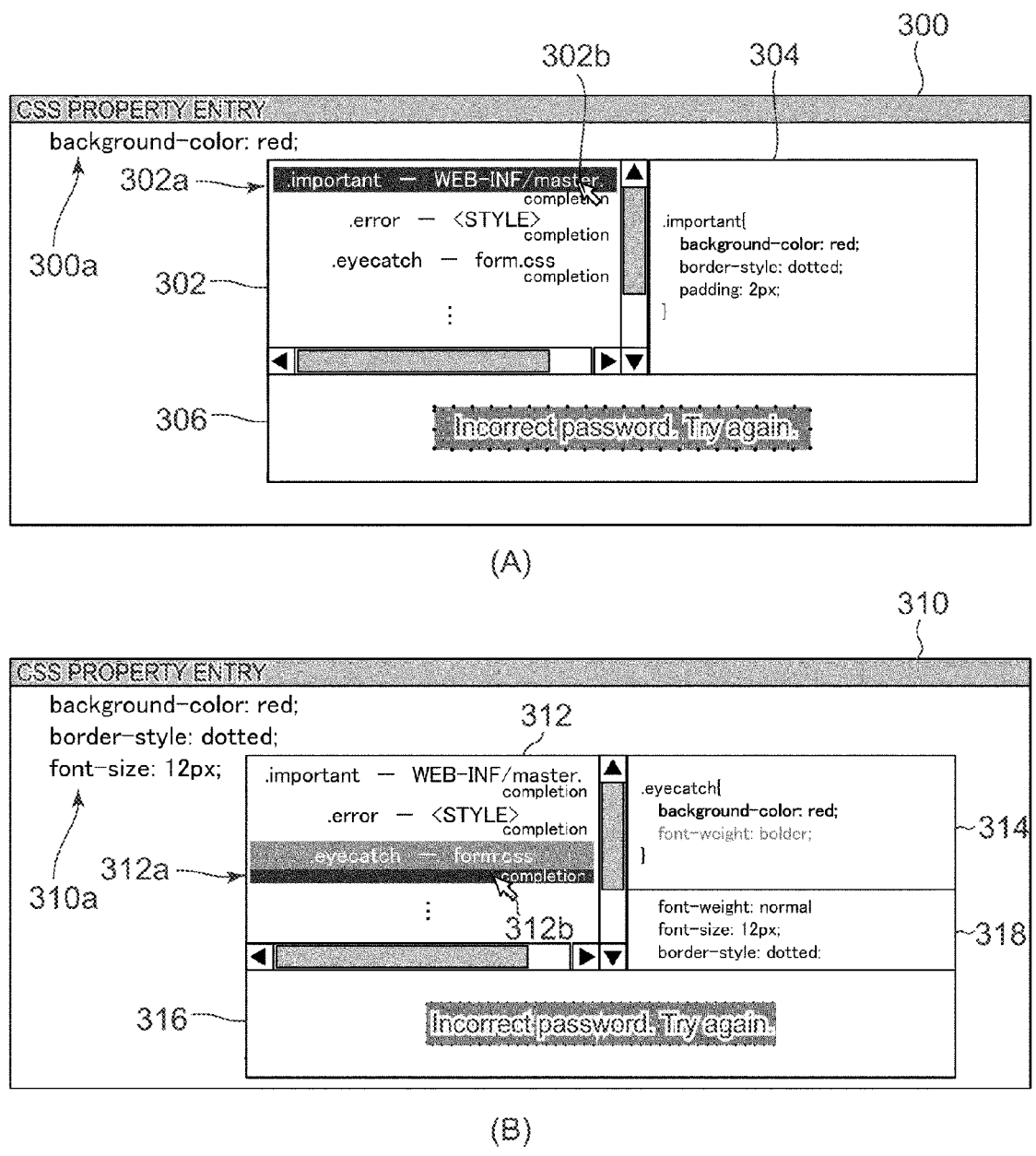
FIG. 6 is an illustration of an editing support GUI screen displayed on the display screen of the computer system according to the embodiment.

The following describes a GUI provided by the CSS editing support function of the embodiment. FIG. 6 illustrates an editing support GUI screen displayed on the display screen of the computer system 10 of the embodiment. FIG. 6(A) shows a window 300 in which a given value of the reference property 100 has been entered. The window 300 includes a text input box for entering the reference property 100 by a direct code description method. In the window 300 shown in FIG. 6(A), a value of the reference property has been entered as indicated by text 300a. After the reference property has been entered, if the operation event for calling editing support occurs, a list 302 pops up. In the list 302, retrieved candidate classes are listed together with their names and paths selectably in order of score. In the example shown in FIG. 6(A), such a case that an item 302a of the "important" class is selected is shown. The selection of a candidate class may be made, for example, by overlapping or clicking of a mouse pointer 302a on the item of a candidate class.

Further, the window 300 shown in FIG. 6(A) is so configured that if any one of the candidate classes is selected, a display box 304 for displaying the definition content of the candidate class and a preview display 306 for showing a state where the candidate class is temporarily applied are displayed in a pop-up manner. If the selected candidate class is changed, the displayed contents of the display box 304 and the preview display 306 are updated according to the definition content of the newly selected candidate class in response to the change in candidate class selection. In the list 302, if an operation event for instructing the confirmation of selection, the candidate class being selected is passed to the style editing section 50 as the confirmed class and applied. In the window 300 shown in FIG. 6(A), a preview of a portion including an element to be edited is displayed.

FIG. 6(B) shows a window 310 in which other values of the reference property 100 have been entered. Like in FIG. 6(A), the reference property has been input by the direct code description method in the window 310 shown in FIG. 6(B) as indicated by text 310a, and the list 312, the display box 314, and the preview display 316 are popping up. In the list 312, retrieved candidate classes are listed together with their names and paths selectably in order of score. In the example shown in FIG. 6(B), such a case that an item 312a specifying the complementary definition of the "eyecatch" class is selected by overlapping a mouse pointer 312b on the item is shown.

In FIG. 6(B), the specification of the complementary definition is selected, and further, a display box 318 for displaying the content of the complementary definition for the candidate class being selected is popping up. In the list 312, if an operation event for instructing the confirmation of choice for specifying the complementary definition occurs, the confirmed class and the complementary definition data are passed to the style editing section 50 and applied. Also in the window 310 shown in FIG. 6(B), a preview of a portion including an element to be edited is displayed.

Figure 7:
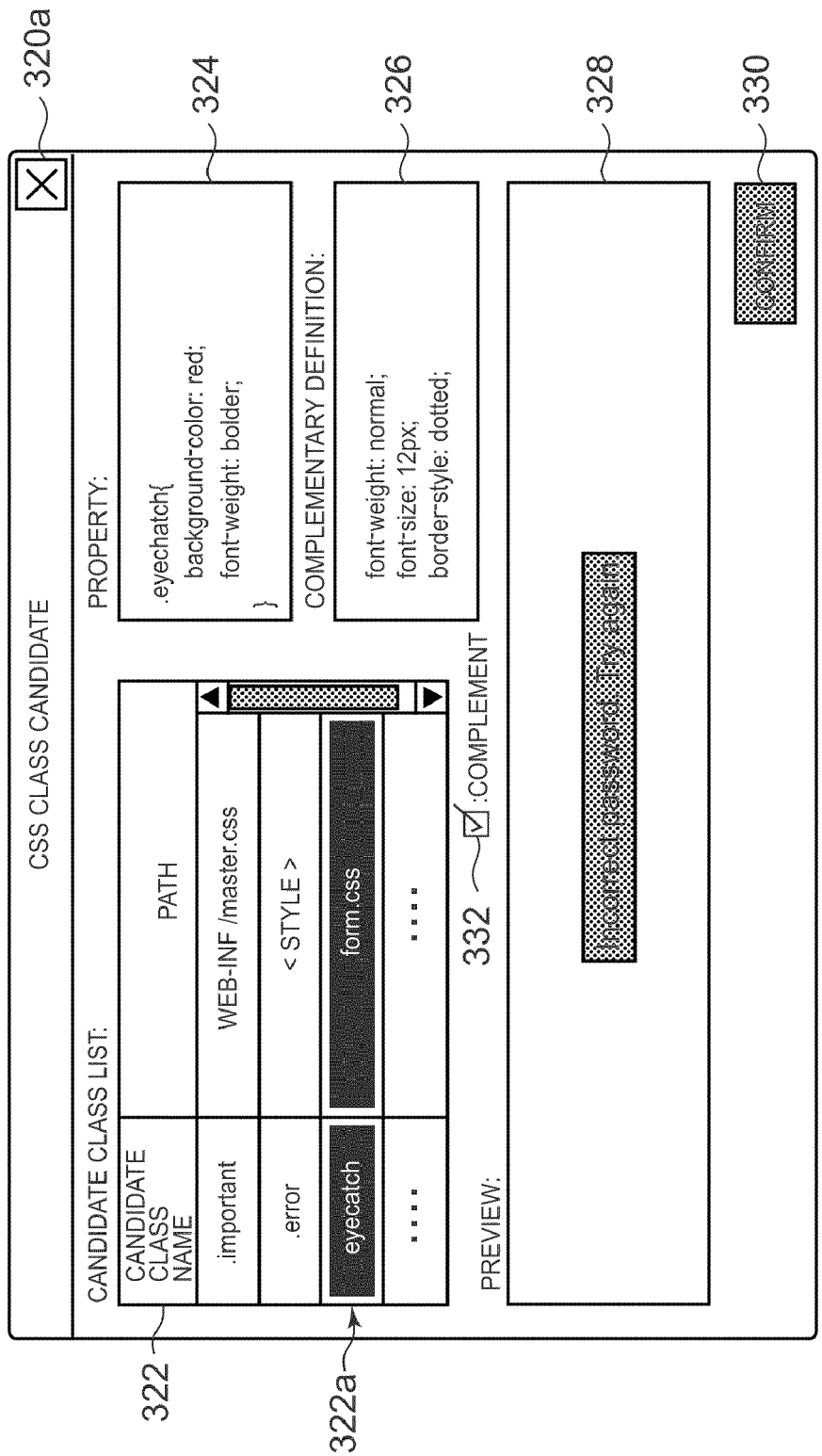
FIG. 7 is an illustration of another example of the editing support GUI screen displayed on the display screen of the computer system.

FIG. 7 illustrates another example of the editing support GUI screen displayed on the display screen of the computer system 10. A window 320 shown in FIG. 7 is configured to pop up when the operation event for calling editing support occurs after the reference property is entered. The window 320 includes a list box 322 in which retrieved candidate classes are listed together with their names and paths selectably in order of score. In the example shown in FIG. 7, such a case where an item 322a of the "eyecatch" class is selected using the mouse is shown. The window 320 is configured to further include a display box 324 for displaying the definition content of the candidate class being selected, a preview display 328 for drawing a preview when the candidate class is temporarily applied, and a confirm button 330.

The window 320 is configured to further include a checkbox 332 for indicating the need for a complementary definition, and a display box 326 for displaying the definition content of complementary definition data created when the checkbox 332 is checked. In the example shown in FIG. 7, the checkbox 332 is checked. If it is indicated that the complementary definition is needed, a preview showing such a case where the candidate class whose definition content has been corrected by the complementary definition data is applied is drawn in the preview display 328. If the selected candidate class is changed, the displayed contents of the display box 324 and the preview display 328 are updated according to the content of the newly selected candidate class in response to the change in candidate class selection. Then, if the confirm button 330 is clicked, the candidate class being selected in the list box 322 is passed to the style editing section 50 and applied when the checkbox 332 is not checked. On the other hand, when the checkbox 332 is checked, the candidate class being selected in the list box 322 and the complementary definition data are passed to the style editing section 50 and applied.

As mentioned above, on the editing support GUI screen of the embodiment, candidate classes similar to the reference property 100 input partway are proposed to the user to realize an editing support function for simplifying the input of property values, while a candidate class similar to a desired value of the reference property is proposed to the user to realize an editing support function for proposing a complementary definition having an effect equivalent to that of the desired value of the reference property.

The operation event for calling the above-mentioned editing function and the operation event for confirming the selection are not particularly limited. The operation events may respond to the operation of clicking or overlapping of the mouse on a GUI component, the operation of shortcut key input, or any other input operation by the user. Further, the selection operation is not particularly limited as well, and it may be configured to function in conjunction with any input operation through the mouse or the keyboard.

Figure 8:
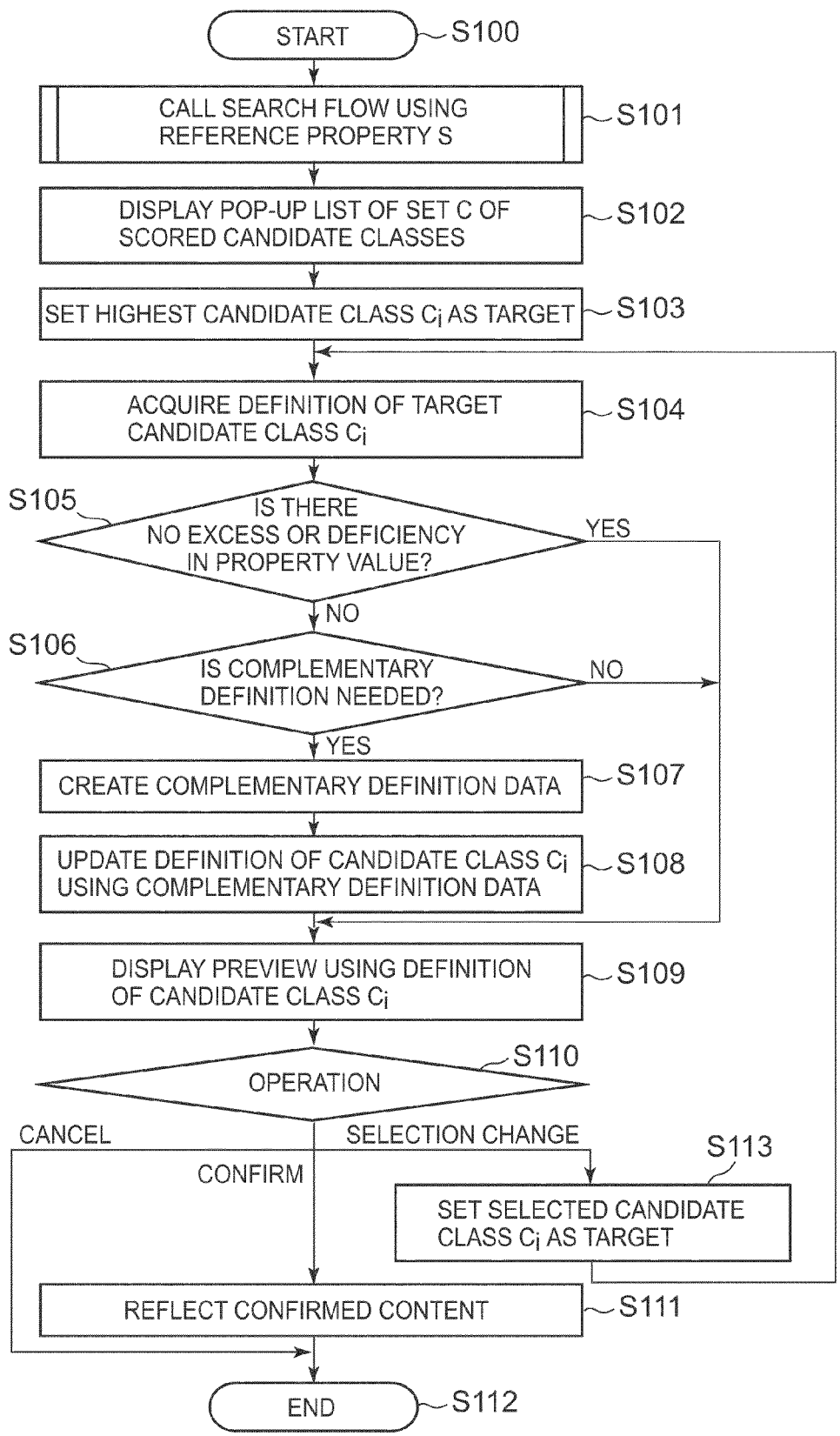
FIG. 8 is a flowchart showing CCS editing support processing performed by the computer system according to the embodiment.

The following describes in more detail processing for realizing the CSS editing support function of the embodiment. FIG. 8 is a flowchart showing CCS editing support processing performed by the computer system 10 of the embodiment. The processing shown in FIG. 8 starts at step S100 in response to the operation event for calling the editing support function. In step S101, the editing support section 60 uses reference property S input through the text input box shown in FIG. 6 to call a search flow performed by the similarity definition searching section 52. The details of the search flow will be described later. In step S102, the editing support section 60 acquires the search results from the similarity definition searching section 52, calls the list presenting section 58 to cause a list of a set C of scored candidate classes to pop up, and in step S103, the candidate class C1 with the highest score is set as the selection target as default.

In step S104, the editing support section 60 acquires the definition content of a candidate class $C_i$ ($i=1$ by default) as the selection target, and causes the definition content of the candidate class being selected to be displayed like in the text display box 304 shown in FIG. 6(A). In step S105, the editing support section 60 determines whether there is no excess or deficiency in property values. If it is determined in step S105 that there is no excess or deficiency in property values (YES), processing is passed to step S109. In step S109, the editing support section 60 calls the preview drawing section 56 to display a preview according to the definition content of the candidate class being selected. On the other hand, if it is determined in step S105 that there is an excess or deficiency (NO), processing is passed to step S106.

In step S106, it is determined whether a complementary definition is needed. In step S106, it is determined that a complementary definition is needed when the item for which the complementary definition is specified is selected, for example, in the window 310 shown in FIG. 6(B), or the checkbox 332 specifying the complementary definition is checked in the window 320 shown in FIG. 7. If it is determined in step S106 that the complementary definition is unnecessary (NO), processing is passed to step S109. In step S109, the editing support section 60 calls preview drawing section 56 to display a preview according to the definition content of the candidate class being selected, for example, like in the preview display 306 shown in FIG. 6(A). On the other hand, if it is determined in step S106 that the complementary definition is necessary (YES), processing is passed to step S107.

In step S107, the editing support section 60 calls the complementary definition creating section 54 to create complementary definition data for complementing the differences from the reference property S and the candidate class Ci being selected, and causes the definition content of the created complementary definition data to be displayed, for example, in the text display box 318 shown in FIG. 6(B) or in the display box 326 shown in FIG. 7. In step S108, the definition content of the candidate class is corrected by the created complementary definition data and updated. In step S109, the editing support section 60 calls the preview drawing section 56 to display a preview according to the corrected definition content of the candidate class being selected, for example, like in the preview display 316 or 328 shown in FIG. 6(B) or FIG. 7.

The editing support section 60 monitors operation events to the GUI screen provided by the editing support function, and determines in step S110 whether the operation event from the user indicates "selection change," "confirm," or "cancel." If it is determined that the operation event corresponding to "cancel" has occurred (CANCEL), processing is passed to step S112 to end the editing support processing at step S112.

On the other hand, if it is determined in step S110 that the operation event corresponding to the confirmation of selection has occurred (CONFIRM), processing is passed to step S111. In step S111, the confirmed definition content, i.e., the confirmed class if the complementary definition is unnecessary, or the confirmed class and the corresponding complementary definition data if the complementary definition data is used to apply the definition content to the HTML document, and at step S112, the processing is ended. On the other hand, if it is determined in step S110 that the operation event corresponding to selection change has occurred (SELECTION CHANGE), processing branches to step S113. In step S113, the newly selected candidate class is set as the target, and processing branches to step S104.

Figure 9:
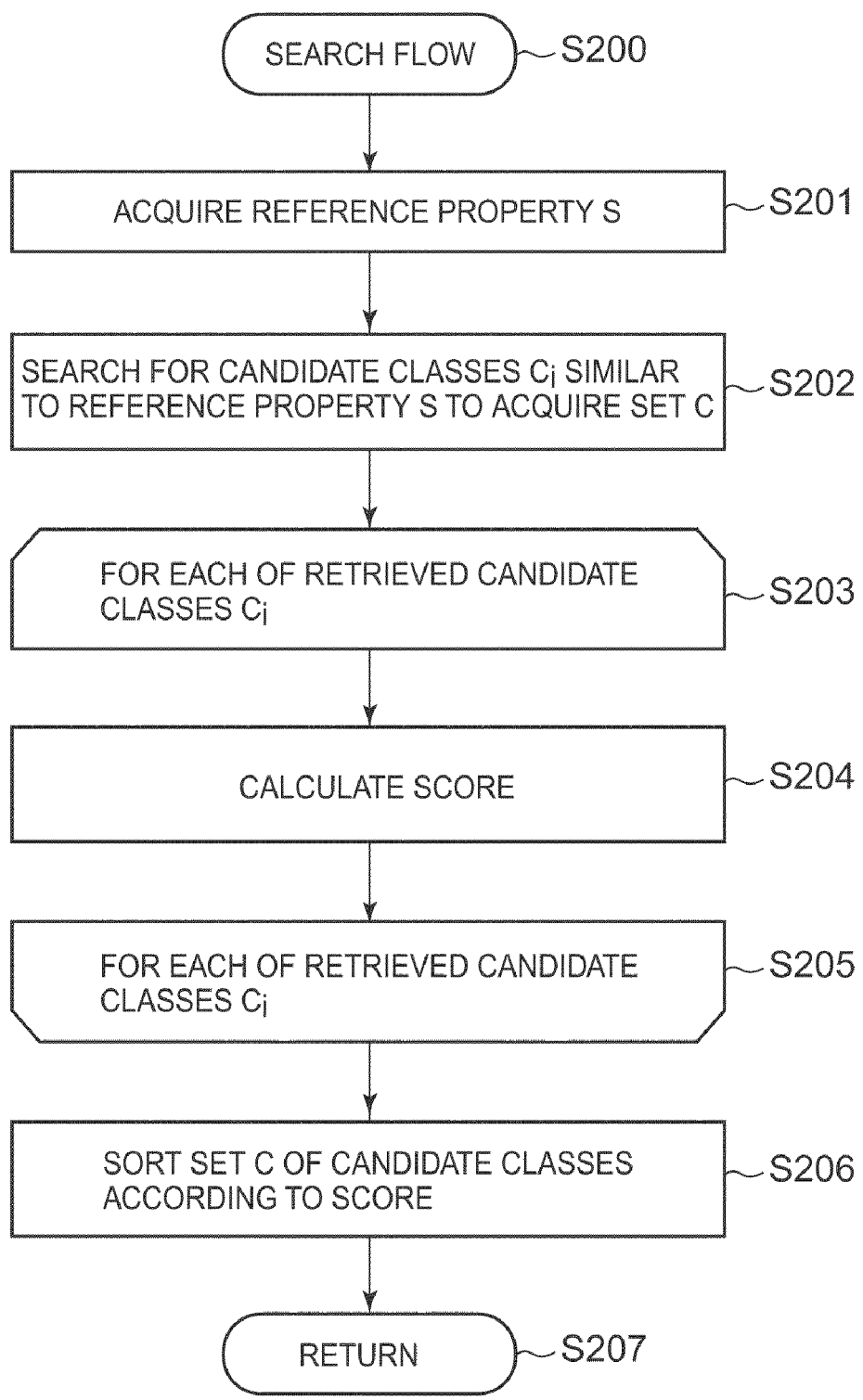
FIG. 9 is a flowchart showing a search flow of searching for similar classes performed by the computer system according to the embodiment.

The following describes the search flow called at processing step S101 shown in FIG. 8. FIG. 9 is a flowchart showing the search flow of searching similar classes performed by the computer system 10 of the embodiment. The processing shown in FIG. 9 is called at the processing step S101 shown in FIG. 8 to start at step S200. In step S201, the similarity definition searching section 52 acquires the reference property S, and in step S202, a search query is expanded to search for candidate classes Ci similar to the reference property S in order to acquire the set C thereof.

In a loop from step S203 to step S205, the processing step S204 in the loop is repeated for each of the retrieved candidate classes Ci. In step S204, scores are calculated for the candidate classes Ci using the evaluation function. Upon completion of calculating the scores for all the candidate classes Ci, processing exits the loop from step S203 to step S205, and proceeds to step S206. In step S206, the similarity definition searching section 52 sorts the candidate classes of the set C in decreasing order according to the score to create the search results. After that, processing is ended at step S207.

According to the processing flow shown in FIG. 8 and FIG. 9, classes similar to data set including the input desired property values are retrieved from the predefined classes, and presented. This allows the user who is creating a web content to easily find, from the predefined classes, a class in which a style specifying a desired modification is defined. Further, the predefined classes can be reused efficiently. Thus, the user-friendly, efficient, and effective CSS editing support function for HTML documents can be realized. Further, if a similar class is predefined, since the class is presented, the probability of duplicate definitions of a class specifying the exact or equivalent modification, or a modification having a difference within an allowable range is preferably reduced, and hence an increase in CSS data size and complication of code are prevented.

Further, the processing by the complementary definition creating section 54 realizes a style desired by the user from the minimum definition data corresponding to the differences between the data set and the candidate class even if extra and/or lacking property values that exceed a user's tolerance exist, making it possible to make efficient use of predefined classes. Further, before actually applying the CSS definition to an HTML document, the preview drawing section 56 allows the user to check the effect of the style appearing in the case that the CSS definition is applied, making it possible to improve the efficiency of web content creation work.

The aforementioned embodiment has described the case where, when a complementary definition is specified, the complementary definition data is applied, for example, by defining a style attribute in line, by defining a rule set using the ID of the target element as a selector, or by adding class attributes specifying multiple classes to the target element. Another embodiment to be described below is to reuse the predefined classes more efficiently by further giving the created complementary definition data to the similarity definition searching section 52 to search for classes similar to the complementary definition data and reuse the retrieved classes in order to dissolve the differences between the initial reference property and the candidate classes. Since the other embodiment to be shown below has the same configuration as the aforementioned embodiment, except for the GUI provided by the editing support function and the flow of editing support processing, the following mainly describes the different portions.

Figure 10:
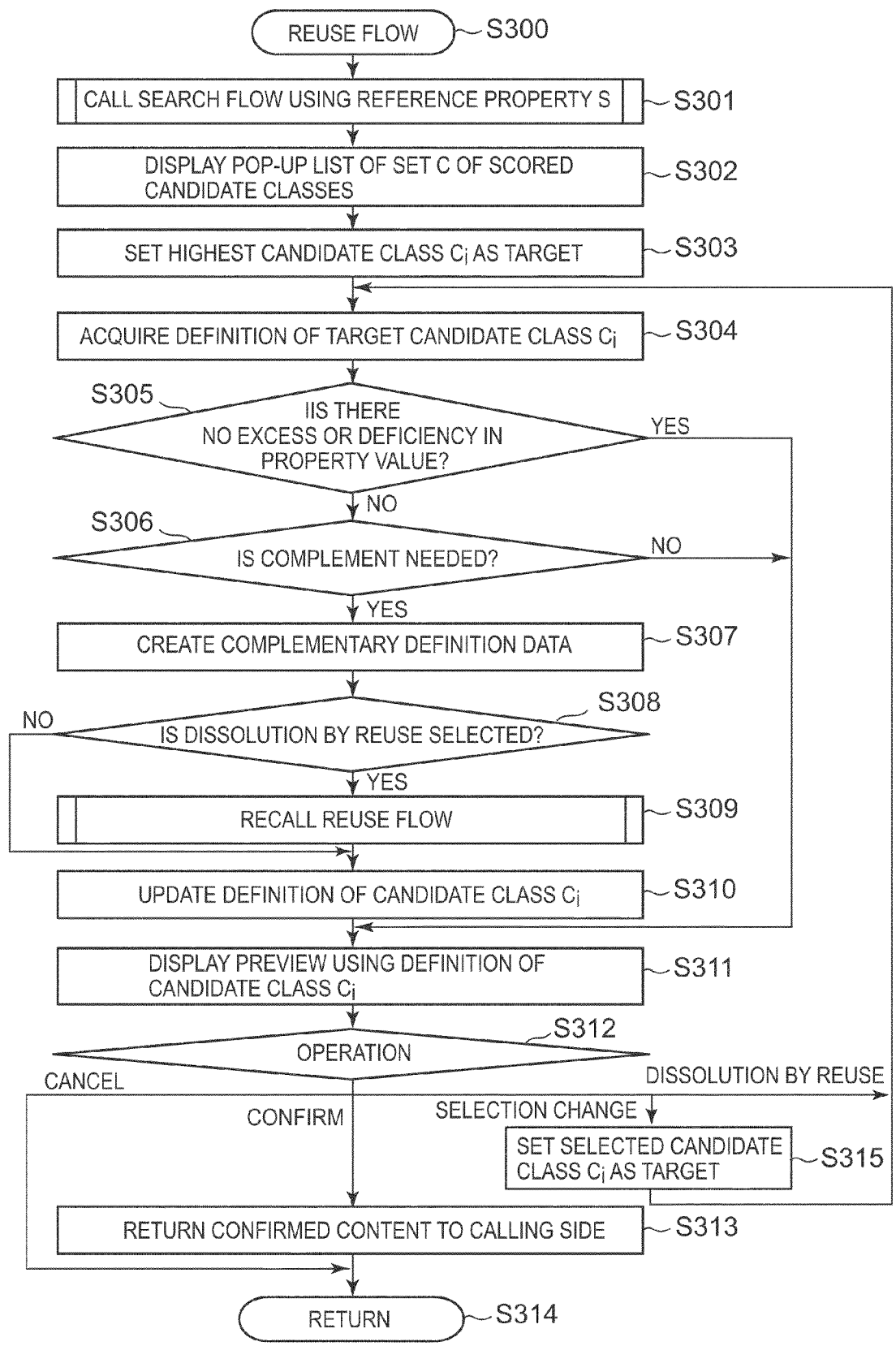
FIG. 10 is a flowchart showing CCS editing support processing according to another embodiment.
Figure 11:
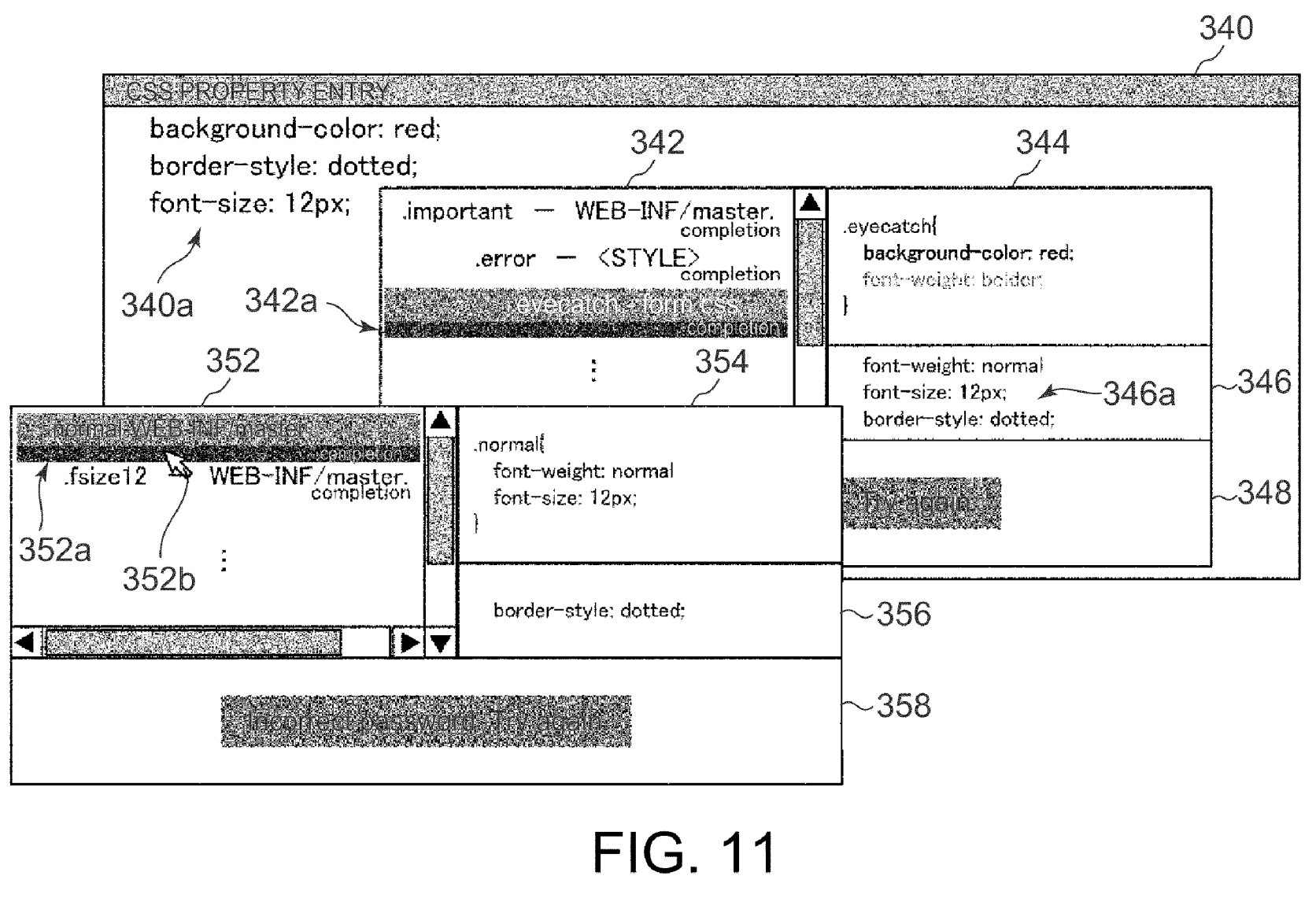

The following describes processing for realizing the CSS editing support function of the other embodiment. FIG. 10 is a flowchart showing CCS editing support processing of the other embodiment. FIG. 11 illustrates an editing support GUI screen displayed on the display screen in the other embodiment. In FIG. 11, a window 340 in which the given reference property 100 has been entered is shown. In the window 340, the reference property entered by the user and indicated by text 340a are input.

Referring again to FIG. 10, the processing shown in FIG. 10 starts at step S300 in response to the operation event for calling the editing support function. In step S301, the editing support section 60 calls the search flow by the similarity definition searching section 52 using the input reference property S. The search flow is the same as that of the processing flow shown in FIG. 9. In step S302, the editing support section 60 acquires the search results from the similarity definition searching section 52, calls the list presenting section 58 to cause a list of the set C of scored candidate classes to pop up, like the list 342 shown in FIG. 11, and in step S303, the candidate class Ci of the top score is set as the selection target as default.

In step S304, the editing support section 60 acquires the definition content of the candidate class Ci (i=1 by default) as the selection target, and causes the definition content of the candidate class being selected to be displayed like in the text display box 344 shown in FIG. 11. In step S305, the editing support section 60 determines whether there is no excess or deficiency in property values. If it is determined in step S305 that there is no excess or deficiency in property values (YES), processing is passed to step S311. In step S311, the editing support section 60 calls the preview drawing section 56 to display a preview according to the definition content of the candidate class being selected, like the preview display 348 shown in FIG. 11. On the other hand, if it is determined in step S305 that there is an excess or deficiency (NO), processing is passed to step S306.

In step S306, it is determined whether a complementary definition is needed. In step S306, if it is determined that a complementary definition is unnecessary (NO), processing is passed to step S311. In step S311, the editing support section 60 calls the preview drawing section 56 to display a preview according to the definition content of the candidate class being selected. On the other hand, it is determined in step S306 that the complementary definition is necessary (YES), processing is passed to step S307.

In step S307, the editing support section 60 calls the complementary definition creating section 54 to create complementary definition data for complementing the differences from the reference property S and the candidate class Ci being selected, and display the definition content of the created complementary definition data, for example, in a text display box 346 shown in FIG. 11. In the example shown in FIG. 11, the complementary definition data indicated by text 346a is displayed. In step S308, the editing support section 60 determines whether dissolution of differences by reuse is selected. The dissolution of differences by reuse is not selected in the initial state of the reuse flow, and it is selected when an operation event for instructing the dissolution by reuse occurs in step S312 to be described later.

In step S308, if the dissolution by reuse is not selected, processing directly proceeds to step S310. In step S310, the definition content of the candidate class Ci is updated using the created complementary definition data, and in step S311, the editing support section 60 calls the preview drawing section 56 to display a preview according to the corrected definition content of the candidate class being selected.

The editing support section 60 monitors operation events to the GUI screen provided by the editing support function, and determines in step S312 whether the operation event from the user indicates "SELECTION CHANGE," "CONFIRM," "DISSOLUTION BY REUSE," or "CANCEL." If it is determined in S312 that the operation event corresponding to "cancel" has occurred (CANCEL), processing is passed to step S314 to end the reuse flow and return processing to the calling side.

On the other hand, if it is determined in step S312 that the operation event corresponding to confirmation of the selection has occurred (CONFIRM), processing is passed to step S313. In step S313, the confirmed definition content is returned to the calling side, and the reuse flow is ended at step S314 to return processing to the calling side. Note that if the dissolution by reuse is not confirmed, the confirmed class and the corresponding complementary definition data are not returned as the definition content to be returned in step S313.

On the other hand, if it is determined in step S312 that the operation event corresponding to selection change has occurred (SELECTION CHANGE), processing branches to step S315. In step S315, the newly selected candidate class is set as the target, and processing branches to step S304.

On the other hand, if it is determined in step S312 that the operation event corresponding to the selection of dissolution by reuse has occurred (DISSOLUTION BY REUSE), processing branches to step S304. The operation event corresponding to the selection of dissolution by reuse is not particularly limited as well as long as it is distinguishable from the other instructions, and it may be the operation event that responds to the operation of clicking or overlapping of the mouse on a GUI component, the operation of shortcut key input, or any other input operation by the user.

If it is determined in step S312 that the operation event corresponding to the selection of dissolution by reuse has occurred, processing is passed to step S309 when processing reaches step S308 in the next loop. In step S309, the editing support section 60 recursively calls the reuse flow shown in FIG. 10 by setting, as the reference property S, the created complementary definition data corresponding to the candidate class being selected. In the example shown in FIG. 11, an item 342a specifying the complementary definition of the "eyecatch" class is selected, and the corresponding complementary definition data indicated by text 346a is given as the reference property S.

Referring again to FIG. 10, in step S301 of the reuse flow as the recalled destination, the editing support section 60 gives the complementary definition data created on the recalling side as the reference property S to search for classes similar to the complementary definition data. In this case, since priority is given to the definition of one class behind the other in CSS2, it is preferable that the search range be limited to those in reading positions of a candidate class selected on the calling side and subsequent candidate classes.

In step S302 of the reuse flow as the recalled destination, the editing support section 60 acquires the search results obtained using the complementary definition data on the recalling side, and calls the list presenting section 58 to cause a list of the set C of scored candidate classes to pop up like a list 352 shown in FIG. 11. In step S304 of the reuse flow as the recalled destination, the editing support section 60 acquires the definition content of the candidate class Ci as the selection target to display the definition content of the candidate class being selected like in a text display box 354 shown in FIG. 11. In step S307 of the reuse flow as the recalled destination, the editing support section 60 calls the complementary definition creating section 54 to create complementary definition data for complementing the differences from the complementary definition data on the recalling side and the candidate class Ci selected in this flow. For example, the definition content of the created complementary definition data is displayed in a text display box 356 shown in FIG. 11.

In step S312 of the reuse flow as the recalled destination, if it is determined that the operation event corresponding to the confirmation of selection has occurred (CONFIRM), the confirmed class in this flow and the corresponding complementary definition data are retuned to the recalling side in step S313, and this flow is ended at step S314 to return processing to the recalling side.

After returning processing to the recalling side, the returned class and corresponding complementary definition data are used appropriately to update the definition content of the candidate class Ci in step S310, and in step S311, the editing support section 60 calls the preview drawing section 56 to display a preview according to the corrected definition content of the candidate class being selected.

If it is determined in step S312 on the recalling destination that the operation event corresponding to the confirmation of selection has occurred (CONFIRM), the confirmed definition content is returned to the flow calling side (e.g., the style editing section 50) in step S313, and in step S314, this flow is ended to return processing to the flow calling side (the style editing section 50 in this case). In this case, since dissolution by reuse is confirmed in the flow at the recalling destination, the confirmed class returned from the recalling destination, the complementary definition data corresponding to the class, and the candidate class being selected in this flow are returned appropriately as the definition content to be returned in step S313. If plural classes are returned, the style editing section 50 adds plural class attributes together with the plural class names to specify the classes simultaneously in order to apply the style definitions to the HTML document. The number of recursive callings is not particularly limited, but it may be limited to a certain number.

According to the processing flow described with reference to FIG. 10 and FIG. 11, classes similar to the complementary definition data that copes with the differences between the data set and the confirmed class are further retrieved, and this makes it possible to reuse the predefined classes more efficiently.

Figure 12:
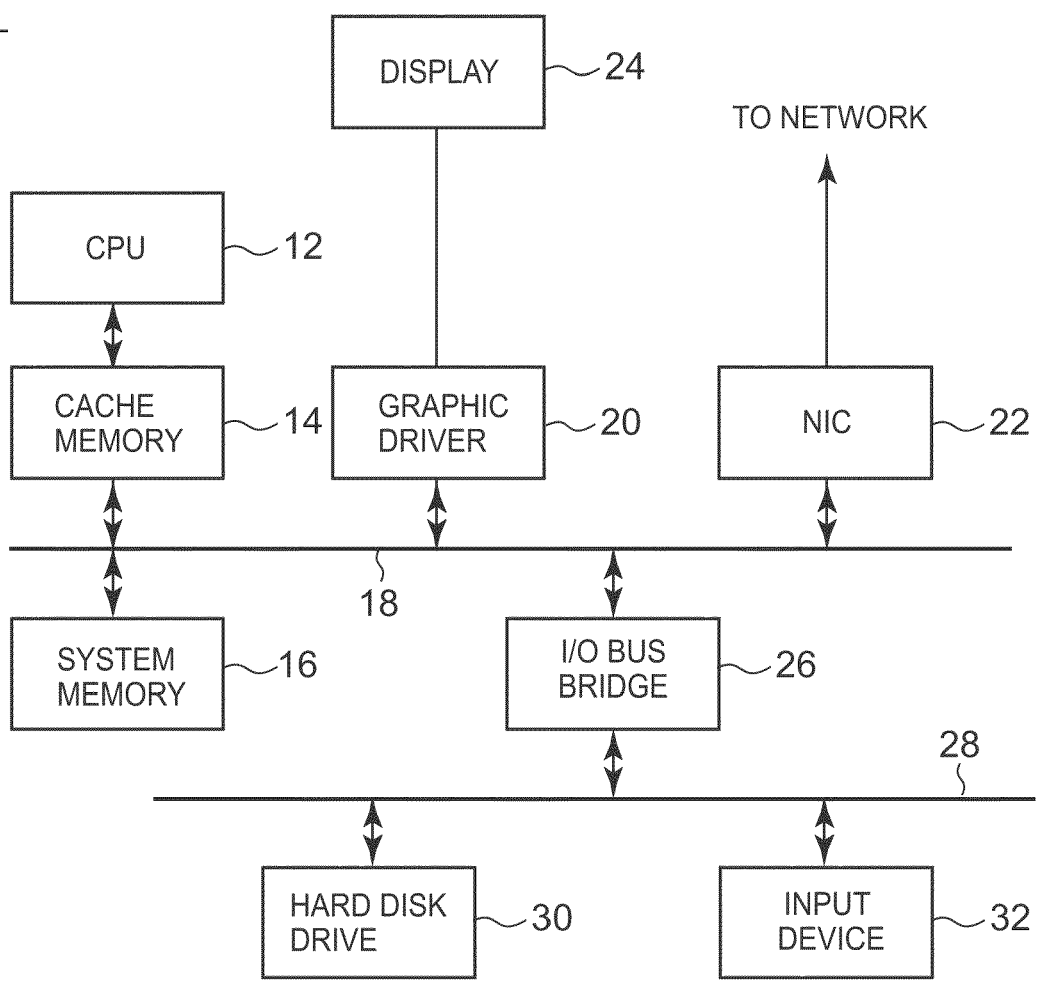
FIG. 12 is a schematic hardware configuration of the computer system.
Figure 13:
FIG. 13 contains illustrations showing a CSS editing function in a conventional web authoring tool.
Figure 13:
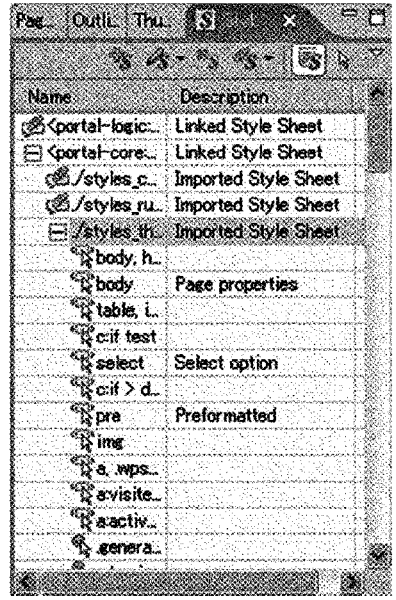
Figure 13:
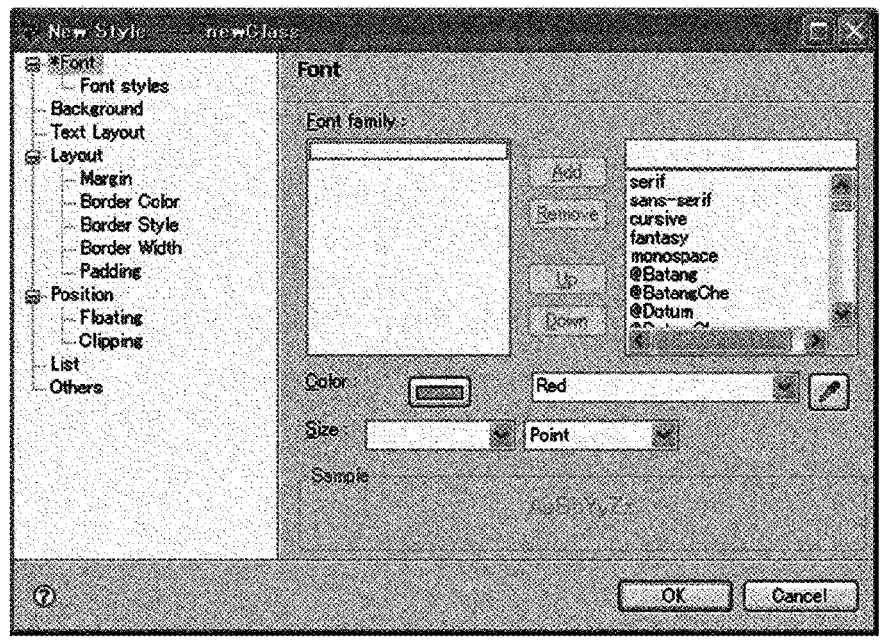

The following describes a hardware configuration of the computer system 10 for implementing the web authoring tool. FIG. 12 shows a schematic hardware configuration of the computer system 10. The computer system 10 shown in FIG. 12 includes a central processing unit (CPU) 12, a cache memory 14 having a level, such as L1 or L2, to enable high-speed access of data used by the CPU 12, and a system memory 16 consisting of solid-state memory devices, such as RAM, DRAM, and the like, enabling processing of the CPU 12.

The CPU 12, the cache memory 14, and the system memory 16 are connected through a system bus 18 to other devices or drivers, e.g., to a graphic driver 20 and a network interface card (NIC) 22. The graphic driver 20 is connected to an external display 24 through a bus to display the processing results of the CPU 12 on a display screen. The NIC 22 connects the computer system 10 to a network using a proper communication protocol, such as TCP/IP, at the physical layer level and the data-link layer level.

An I/O bus bridge 26 is also connected to the system bus 18. A hard disk 30 is connected downstream of the I/O bus bridge 26 through an I/O bus 28 such as PCI by means of IDE, ATA, ATAPI, serial ATA, SCSI, or USB. Further, the input devices 32 including a keyboard and a pointing device such as a mouse are connected to the I/O bus 28 through a bus such as USB, providing a user interface.

The CPU 12 of the computer system 10 may use any single-core processor or multi-core processor. To be more specific, it may use any CISC or RISC chip, such as Xcon®, Itanium®, POWER5®, or POWER PC®. The computer system 10 is controlled by an OS, such as WINDOWS® 200X, UNIX®, or LINUX®, to develop and execute a program on the system memory 16 under the control of OS in order to control the operation of each of the hardware resources. Thus, the configuration and processing of the above-mentioned functional sections can be implemented on the computer.

As described above, according to the embodiments, there can be provided an information processing apparatus, an information processing method, and a program, which enable easy reuse of predefined classes in editing a stylesheet, which defines the style of a structured document described in a markup language such as HTML, to reduce the probability of duplicate definitions so that a web content such as a portal site, a web application, or a homepage can be constructed efficiently.

The aforementioned embodiments describe such a structure to present selectably predefined classes similar to desired property values of reference property in specifying property values for certain elements in an HTML document. However, in other embodiments, the structure can also be used to define a stylesheet applied to an element in the HTML document to be generated. Further, in other embodiments, the structure can be used to check to see if a class similar to a new class to be defined is defined when defining the new class.

Further, the above embodiments take, by way of example, such a case that the structured document is an HTML document and cascading stylesheets (CSS) is used as style definitions to be edited. However, the kind of structured document usable in the embodiments of the present invention is not limited to HTM, and documents written in XML, XHTML, SVG, and other markup languages can also be used. Further, the stylesheet is not limited to CSS, and stylesheets created in other stylesheet languages, such as XSL (eXtensible Stylesheet Language) and DSSSL (Document Style Semantics and Specification Language), can be employed.

Further, in addition to the personal computer in the above-mentioned embodiments, the computer system may be implemented together with various computer system structures including a laptop computer, a multiprocessor system, etc.

The above-mentioned functions of the present invention can be implemented by a device-executable program described in an object-oriented programming language, such as C++, Java®, Java® Beans, Java® Applet, Java® Script, Perl, or Ruby. The program can be distributed by storing it on a device-readable recording medium or transmitted.

While the present invention has been described in connection with the specific embodiments, the present invention is not limited to the embodiments, which those skilled in the art can change by addition, alternation, and/or deletion to make other embodiments. Such embodiments are also included in the scope of the present invention as long as they have the effects of the present invention.

The invention claimed is:

1. An information processing apparatus for supporting style definition of a structured document, the apparatus comprising:
 a computer system comprising a processor and memory;
 a Web authoring tool executing in the memory by the processor of the computer system, the Web authoring tool comprising:
 a registration section configured to register plural classes defining respective styles;
 a search section configured to search for, from the registered classes, candidate classes similar to a data set including property values specifying one or more given style characteristics;

a presentation section configured to present the retrieved candidate classes in a selectable manner; and an application section configured to give the one or more input property values as the data set and applying style definition to the structured document using a class confirmed from the selectable candidate classes.

2. The information processing apparatus according to claim 1 further comprising a creation section configured to compare the property values respectively included in the data set and the candidate classes to create complementary definition data for the candidate classes from differences between the property values.

3. The information processing apparatus according to claim 2, wherein the complementary definition data is recursively given to the search section as the data set, and the creation section creates the next complementary definition data from a difference between the complementary definition data and a recursively retrieved candidate class.

4. The information processing apparatus according to claim 1 further comprising a drawing section configured to draw a preview in the case that the selected candidate class and the corresponding complementary definition data are applied.

5. The information processing apparatus according to claim 1, wherein the presentation section presents at least either definition contents of the candidate classes or paths to files, in which the candidate classes are defined, together with the retrieved candidate classes.

6. An information processing method for supporting style definition of a structured document, the method comprising:

receiving one or more property values specifying style characteristics in style editing section of a Web authoring tool executing in memory by a processor of a computer system;

giving a data set including the one or more input property values from plural registered classes defining respective styles from the style editing section to an editing support section of the Web authoring tool and searching in a similarity definition searching section of the Web authoring tool for candidate classes similar to the data set;

presenting in a list presenting section of the Web authoring tool the retrieved candidate classes in a selectable manner; and applying a style definition to the structured document by the style editing section using a class confirmed from the selectable candidate classes.

7. The information processing method according to claim 6 further comprising the step of comparing the property values respectively included in the data set and the candidate classes and creating complementary definition data for the candidate classes from differences between the property values.

8. The information processing method according to claim 6 further comprising the step of drawing a preview in the case that the selected candidate class and the corresponding complementary definition data are applied.

9. The information processing method according to claim 6 further comprising the step of recursively giving the complementary definition data as the data set to a search section and creating the next complementary definition data from a difference between the complementary definition data and a recursively retrieved candidate class.

10. The information processing method according to claim 6, wherein in the presenting step, at least either definition contents of the candidate classes or paths to files, in which the candidate classes are defined, are presented together with the retrieved candidate classes.

11. A computer program product comprising a computer usable medium embodying computer usable program code for supporting style definition of a structured document, the computer program comprising:

computer usable program code for registering plural classes defining respective styles;

computer usable program code for searching for, from the registered classes, candidate classes similar to a data set including property values specifying one or more given style characteristics;

computer usable program code for presenting the retrieved candidate classes in a selectable manner; and computer usable program code for giving the one or more input property values as the data set and applying a style definition to a structured document using a class confirmed from the retrieved candidate classes.

12. The computer-program product according to claim 11 further comprising computer usable program code for comparing the property values respectively included in the data set and the candidate classes to create complementary definition data for the candidate classes from differences between the property values.

13. The computer program product according to claim 12 further comprising computer usable program code for drawing a preview responsive to applying the complimentary definition data for the candidate classes to the candidate classes.

14. The computer-executable program according to claim 12, wherein the computer usable program code for giving the one or more input property values as the data set and applying a style definition to a structured document using a class confirmed from the retrieved candidate classes, comprises:

computer usable program code for recursively giving the complementary definition data as the data set, and creating a next complementary definition data from a difference between the complementary definition data and a recursively retrieved candidate class.

15. The computer-executable program according to claim 11, wherein computer usable program code for presenting the retrieved candidate classes in a selectable manner comprises computer usable program code for presenting at least either definition contents of the candidate classes or paths to files, in which the candidate classes are defined, together with the retrieved candidate classes.

* * * * *